No. 832,108.
PATENTED OCT. 2, 1906.
J. H. WILSON.
PERCOLATOR.
APPLICATION FILED SEPT. 1, 1905.
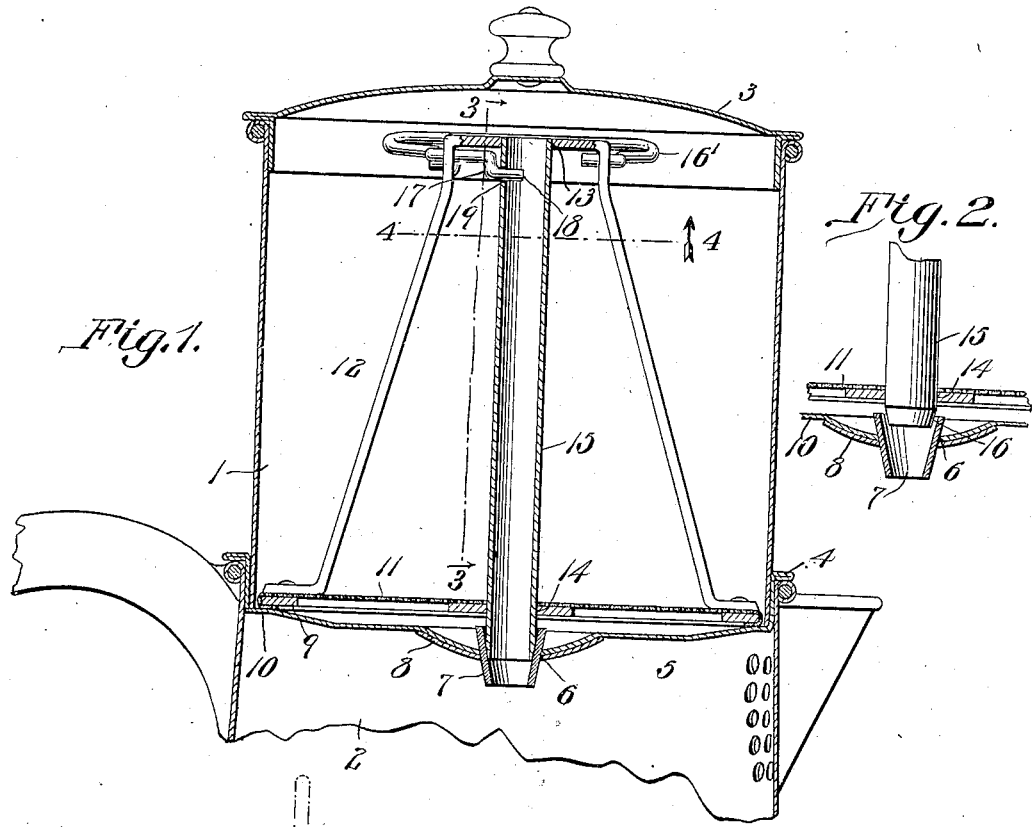
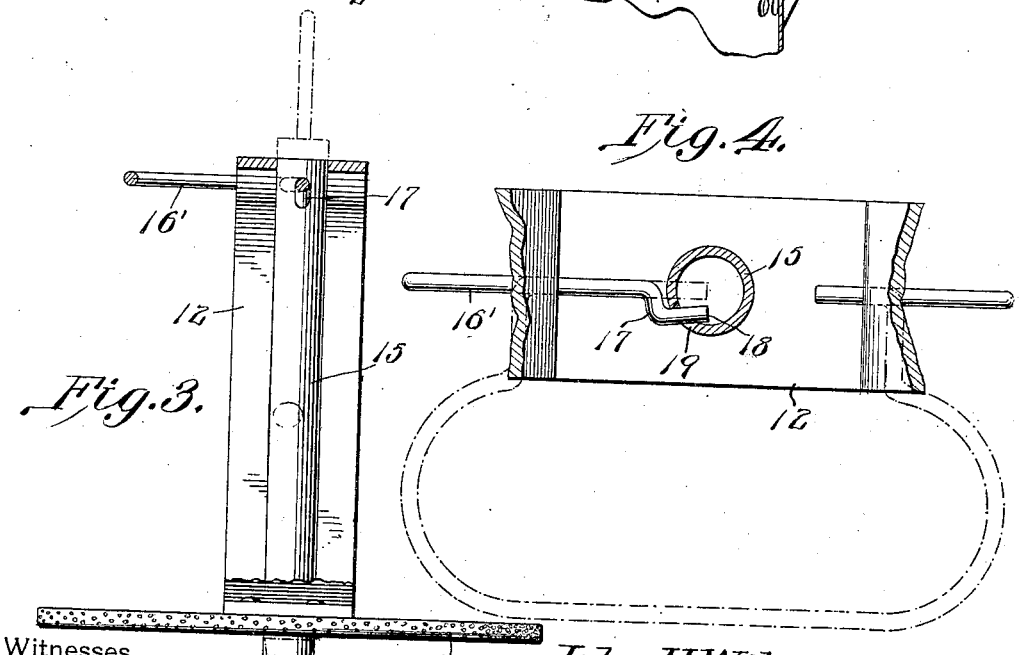
Witnesses
John H. Wilson, Inventor
by C. A. Snow & Co.
Attorneys

UNITED STATES PATENT OFFICE.

JOHN H. WILSON, OF NEW KENSINGTON, PENNSYLVANIA.

PERCOLATOR.

No. 832,108.　　　　Specification of Letters Patent.　　　　Patented Oct. 2, 1906.

Application filed September 1, 1905. Serial No. 276,747.

*To all whom it may concern:*

Be it known that I, JOHN H. WILSON, a citizen of the United States, residing at New Kensington, in the county of Westmoreland and State of Pennsylvania, have invented a new and useful Percolator, of which the following is a specification.

This invention relates to percolators for making infusions of tea, coffee, and the like, and it has special reference to that class of percolators which are used in connection with tea or coffee pots of ordinary construction, the percolator being supported upon the vessel while the coffee or tea is steeping and the infusion being subsequently added to the hot water in the vessel.

The object of the present invention is to present a device of the class described which shall possess superior advantages in point of simplicity, durability, and general efficiency; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a vertical sectional view showing the improved device in position for operation upon a coffee-pot, of which only the upper portion is shown. Fig. 2 is a sectional detail view showing the tubular stopper member raised and disengaged from the bushing in the bottom of the percolator. Fig. 3 is a sectional detail view, taken substantially on the plane indicated by the line 3 3 in Fig. 1, of the strainer detached. Fig. 4 is a sectional detail view taken substantially on the plane indicated by the line 4 4 in Fig. 1, said view being on an enlarged scale.

Corresponding parts in the several figures are indicated throughout by similar characters of reference.

The body or casing of the improved percolator consists of a vessel 1 of suitable dimensions to fit into the upper end of an ordinary tea or coffee pot, a portion of the latter being shown at 2. A cover 3 is provided, which may be the cover properly belonging to the coffee-pot, although if the latter is provided with a hinged lid or cover a separate cover must be provided for the vessel or receptacle 1. The latter is provided near its lower end with an annular flange 4, adapted to rest upon the upper edge of the pot or vessel 2, said flange being shown as being in the nature of an extension of the bottom 5 of the receptacle 1. Said bottom 5 is provided with a central concavity or depression 6, through which extends a tapering bushing 7, the latter and the central depression of the bottom being reinforced by a sheet-metal shield 8.

The strainer which is used in connection with the improved percolator includes a frame 9, adapted to be supported upon a shouldered portion 10 of the bottom 5, said frame being a skeleton, upon which straining material, such as a plate 11 of foraminous sheet metal, is secured. The frame 9 also supports a yoke 12, provided at its upper end with an aperture 13, registering with an aperture 14 in the central portion of the frame 9 for the passage of a vertically-slidable tubular member 15, the lower end of which is beveled, as shown at 16, so as to form a closure for the beveled bushing 7 when said tubular member 15 is in the lowered position. (Shown in Fig. 1.) The sides of the yoke 12 are provided with bearings for a loop or handle member 16′, one end of which is extended to form a crank 17, having a wrist-pin 18, which latter engages an aperture 19 in the tubular member 15 near the upper end of the latter. The crank 17 is so formed upon the handle member 16′ that by turning the latter upwardly to the position shown in dotted lines in Fig. 3 and in full lines in Fig. 4 the said crank will be raised into an approximately horizontal plane, with the effect of elevating the tubular member 15, while by lowering the handle the tube will be lowered to the engaging position. (Shown in Fig. 1.) It will furthermore be understood that when the tubular member is thus manipulated it will at the same time oscillate upon its axis to the extent of approximately one-fourth of a revolution, as will be best understood by reference to Figs. 3 and 4. This oscillatory movement is especially important when the tube is moved downwardly to the position shown in Fig. 1, where it engages the bushing, for the reason that by said oscillatory movement or twisting movement, which resembles that whereby a cork stopper is usually inserted into the neck of a bottle, the beveled lower end of said tubular member will practically be ground to a seat-engaging position, the bushing 7 constituting the seat, and thus forming a tight joint through which water may not readily escape.

From the foregoing description, taken in connection with the drawings hereto annexed, the operation and advantages of this invention will be readily understood. The percolator is placed in position upon the tea or coffe pot, and the material of which an infusion is to be made is placed upon the strainer, the tubular member 15 having first been lowered to the seat-engaging position. (Shown in Fig. 1.) A suitable quantity of water has been previously placed in the pot or vessel 2, and an additional portion of boiling water is poured upon the material contained in the percolator, the lid of which is now placed in position, after which the pot is placed over a fire, where its contents will be kept in a state of ebullition. The steam rising from the water contained in the pot or vessel will pass through the bushing 7 and the tubular member 15 and will be deflected upon the contents of the percolator, which will be thereby kept at a temperature near the boiling-point. This is the condition which by practical experience has been proven to be most favorable to the process of steeping or extracting from the material from which the infusion is to be made its valuable qualities. When the steeping has proceeded for a sufficient period of time, the lid is removed and the handle member 16′ is elevated to the position shown in dotted lines in Fig. 3, thus elevating the tubular member 15 to the unseated position (shown in Fig. 2) and permitting the infusion to pass from the percolator into the water contained in the vessel 2, it being of course assumed that an infusion of sufficient strength is made to require the admixture of the water contained in the vessel 2 in order to form a palatable drink, the strength of which may be regulated by the quantity of material used to make the infusion and the relative quantity of water placed in the pot or vessel.

This improved device, as will be readily seen, is simple in construction and may be provided at a moderate expense. It will also be seen that the improved percolator is entirely independent of the pot or vessel in connection with which it is used, thus enabling it to be manufactured and sold as an independent article of manufacture, it being obviously made in various sizes and proportions. It will be noted that the supporting-flange 4, which forms an extension of the bottom, is of sufficient dimensions to enable a single percolator to be used in connection with pots or vessels of different dimensions.

Having thus described the invention, what is claimed is—

1. A percolator having an opening extending through the bottom thereof, a tubular closure for said opening, an auxiliary bearing for said closure, and a pivotally-supported member having a crank provided with a wrist-pin engaging an aperture in the closure.

2. A percolator-receptacle having a dished bottom, a bushing extending through an opening in the bottom, a strainer supported upon the bottom and having an upright yoke, a member guided in the strainer and yoke to form a closure for the bushing in the bottom of the receptacle, and means connected with the yoke for manipulating said closure member.

3. A percolator-receptacle having a dished bottom and an opening therethrough, a strainer-frame supported upon the bottom, a yoke upon the frame, a closure member guided for longitudinal and oscillatory movement in the frame and yoke, and a handle member connected with the latter and having a crank provided with a wrist-pin engaging an aperture in the closure member.

4. A percolator-receptacle having an aperture in the bottom thereof, a strainer-frame supported on the bottom and having an upright yoke, a tubular member guided in the strainer-frame and yoke and constituting a closure for the aperture in the bottom of the receptacle, and means connected with the yoke for imparting to the closure member a combined longitudinal and oscillatory movement.

In testimony that I claim the foregoing as my own I have hereto affixed my signature in the presence of two witnesses.

JOHN H. WILSON.

Witnesses:
  REBECCA A. WALLEY,
  HARRY A. WALLEY.